United States Patent [19]

Bratvold et al.

[11] Patent Number: 4,724,499
[45] Date of Patent: Feb. 9, 1988

[54] DISK DRIVE ENCLOSURE WITH AN INCLINED PARTING SURFACE

[75] Inventors: Darrell E. Bratvold, Rochester; Richard W. Luoma, Chatfield, both of Minn.

[73] Assignee: International Business Machines Corporation, Armonk, N.Y.

[21] Appl. No.: 787,933

[22] Filed: Oct. 16, 1985

[51] Int. Cl.$^4$ .................... G11B 33/02; G11B 33/14; G11B 5/012; G11B 5/54
[52] U.S. Cl. .................................... 360/98; 360/106
[58] Field of Search .................... 360/97-99, 360/102, 103, 133, 106, 137; 369/75.1, 292; 206/444

[56] References Cited

U.S. PATENT DOCUMENTS

| | | | |
|---|---|---|---|
| 4,034,411 | 7/1977 | Kraemer et al. | 360/98 |
| 4,280,155 | 7/1981 | Scott et al. | 360/98 |
| 4,363,056 | 12/1982 | Riggle et al. | 360/98 |
| 4,633,349 | 12/1986 | Beck et al. | 360/97 |

FOREIGN PATENT DOCUMENTS

| | | | |
|---|---|---|---|
| 3404223 | 8/1985 | Fed. Rep. of Germany | 360/97 |
| 58-102364 | 6/1983 | Japan | 360/97 |

OTHER PUBLICATIONS

Kaneko et al., "3.2 G Byte Multi-Device Disk Storage Development, " E.C.L. Tech. Journal, vol. 31, No. 1, pp. 241-248, (1982).

Primary Examiner—Stuart N. Hecker
Assistant Examiner—Benjamin E. Urcia
Attorney, Agent, or Firm—Robert W. Lahtinen

[57] ABSTRACT

An enclosure for a rigid disk data file is shown which includes a base casting and a cover that interface along planar surface that is not perpendicular to the axis of the spindle supporting the data disks. The base casting at one side extends axially along the disk stack and has the transducer positioning actuators mounted through openings therein. At the opposite side, the disk stack is fully exposed to permit easy access to the disk surface for procedures such as servo writing during manufacture of the drive. This structure makes possible concurrent operation of the product heads and servo writing heads.

6 Claims, 5 Drawing Figures

DISK DRIVE ENCLOSURE WITH AN INCLINED PARTING SURFACE

BACKGROUND OF THE INVENTION

The present invention relates to disk storage devices. In particular, it is directed to a storage device head-disk enclosure for drives that are servo written with permanent data.

Disk enclosures must be sealed against particulate matter that might be introduced from the surrounding ambient atmosphere. Therefore, the head-disk enclosure is hermetically sealed, sealed with the provision of a breather filter or provided with a continuous supply of filtered air. Rigid disk files also have permanently recorded servo information that must be written on the disk storage surfaces at manufacture. The disk stack of the drive should be accessible from a radial side to enable the servo writing operation to occur without having equipment that might be the source of particulate matter, suspended over the disk data surfaces. A significant portion of the disk stack periphery should be exposed to enable several transducer heads to simultaneously access the disk surfaces, since some servo read-write functions functions must occur concurrently.

Further, the operations that could be accomplished separately or consecutively, would still be accomplished on the most cost effective basis if done simultaneously.

Also, the product heads that will be permanently associated with the disk file should be mounted and operable during the servo write operation. This permits the servo written information to be placed on the data surface with the same departure from radial transducer positioning and transducer skew as the individual transducer head that will function with the particular surface during the life of the product.

SUMMARY OF THE INVENTION

In the disk drive of the present invention, the cover and base cooperate to present a planar interface surface which is inclined at an angle and not perpendicular to the axis of the disk stack. The base casting includes an upright portion through which is mounted the product actuator. The product heads carried by this actuator can be can be used to write selected tracks and the servo heads can be positioned to write with the same deviations. Thus the precision writing of the servo heads can be tailored to have the same non-radial and skew characteristics as the less costly product heads. This servo writing technique is described in U.S. Pat. No. 4,371,902.

Use of the diagonal cover structure makes possible concurrent operation of product heads and the various heads necessary to perform the servo write operations with the cover removed in a clean room environment. It is also possible to use multiple heads an addition to the servo write heads for functions such as erase, the provision of a clock track and speed determination and regulation. This can be accomplished without mounting heads above the disk assembly where they are prone to cause particulate contaminants to be deposited on the disk data surfaces.

The interface surface between the base casting and the cover member is a continuous closed coplanar surface surrounding and enclosing the disk stack. This makes it easier to effect a permanent high integrity seal between base and cover. The base casting includes flange portions at the margins of the interface surface which position and align the gasket and the cover.

DETAILED DESCRIPTION

Figure 1:
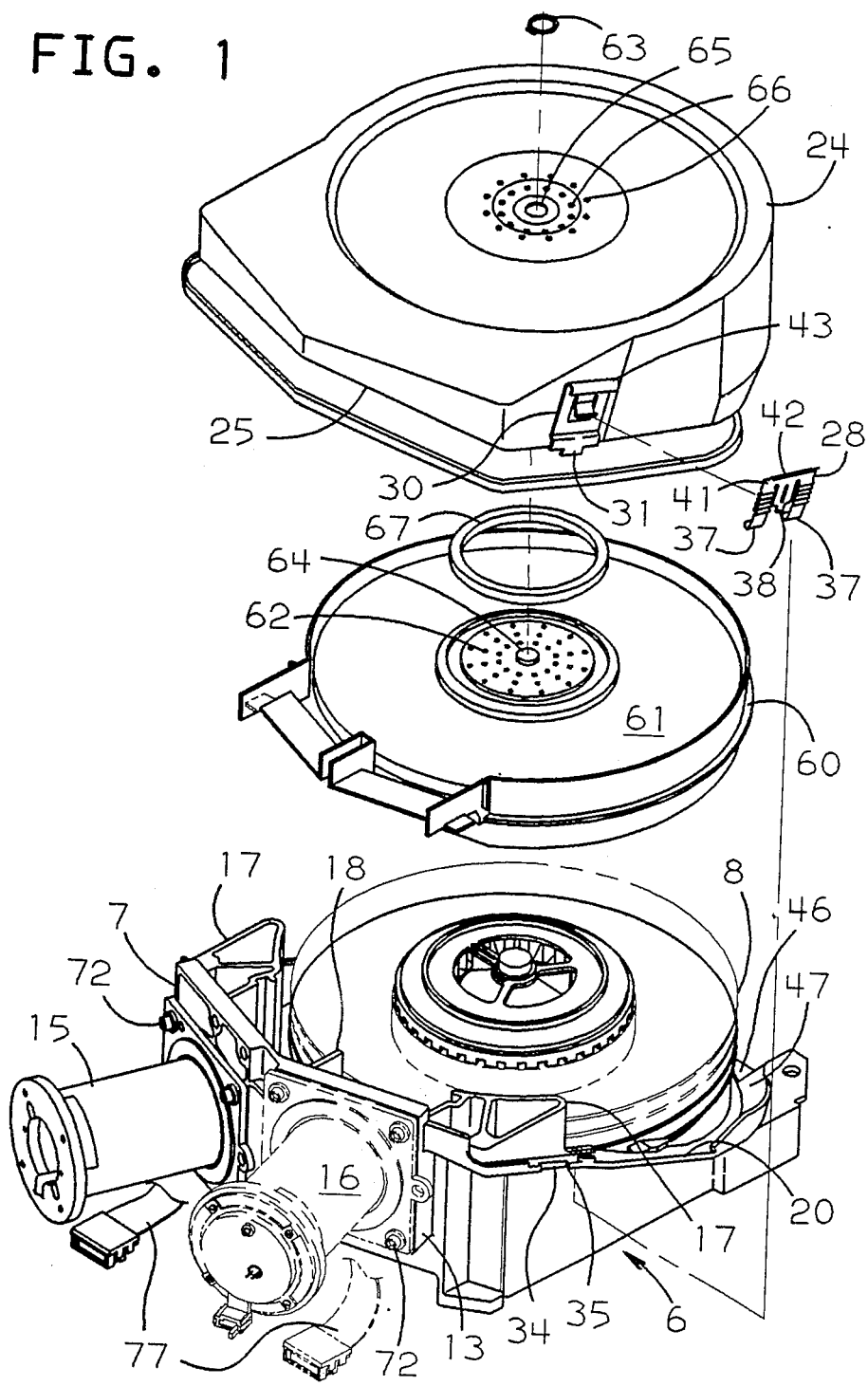
FIG. 1 is an exploded, perspective view of a disk drive with the base casting and cover of the present invention with partially assembled actuators, the disk assembly and the filter cartridge.
Figure 2:
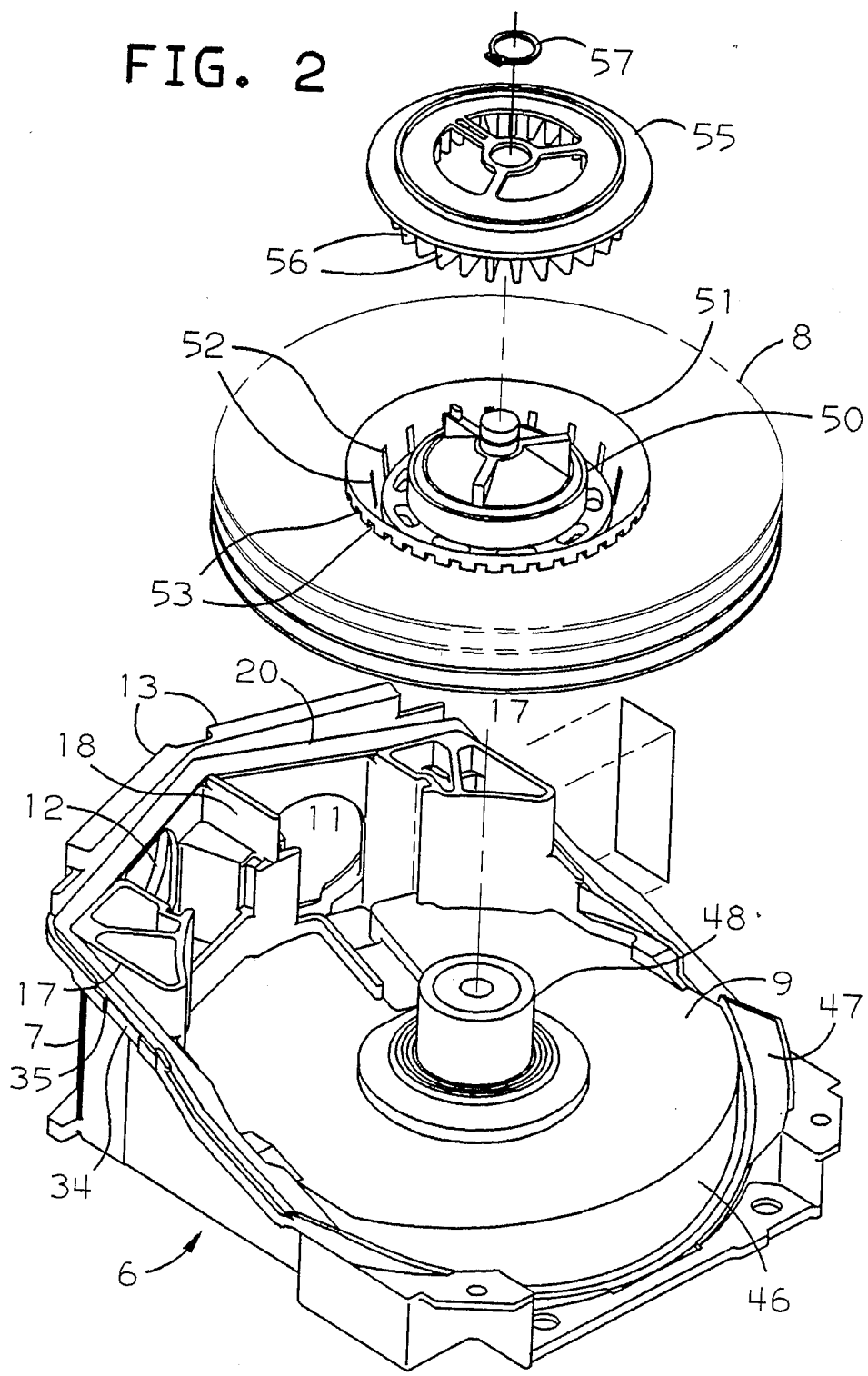
FIG. 2 is a perspective view of the base casting and disk assembly from the radial side opposite the wall portion through which the actuators are mounted.

As seen in FIGS. 1 and 2 the head-disk enclosure includes a base casting 6 which has a portion 7 that extends vertically along one radial side of the space occupied by the disk assembly 8 and at the opposite radial side exposes the edge of the lowest disk of the mounted disk assembly as the parting line or surface between disk pack and cover extends below the plane of the base surface 9 that confronts the lowermost disk surface. The side wall 7 has two apertures 11, 12 in the upright mounting flange portions 13 through which the product actuators 15, 16 carried by the drive are mounted. The upright flange portion 13 is of increased thickness and adjoins support structures 17, 18 that provide rigidity and partially define the cylindrical volume of the enclosure about the rotating disk assembly 8.

Figure 3:
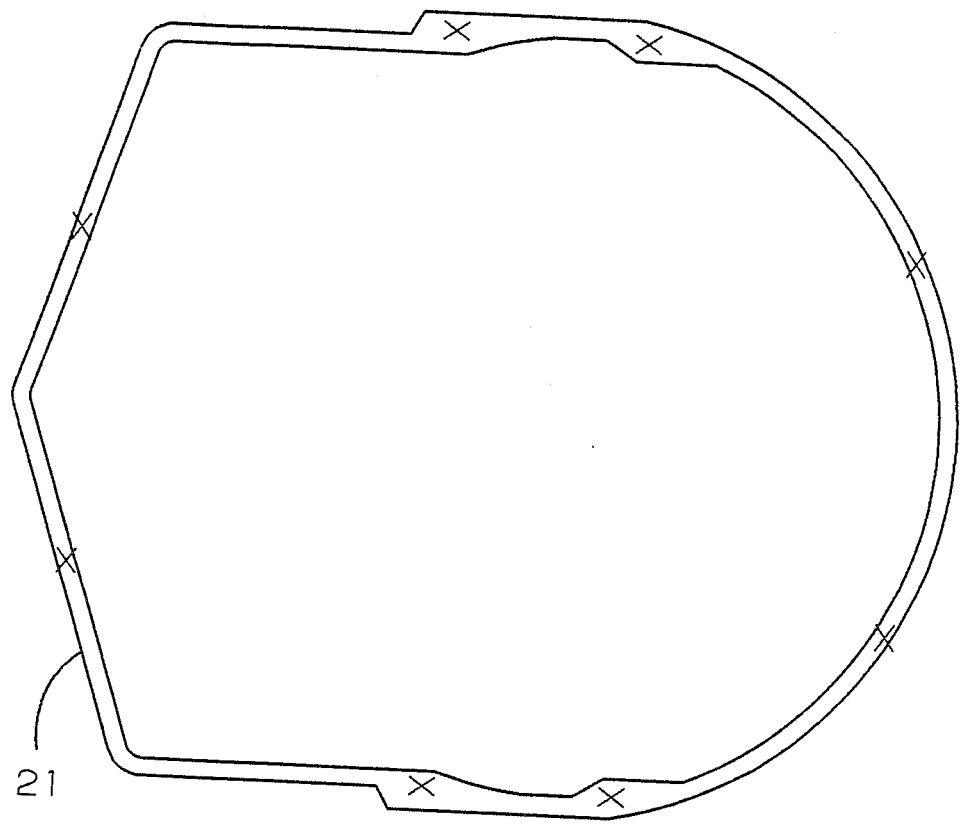
FIG. 3 is a plan view of the gasket.

The casting presents a continuous planar surface 20 which surrounds disk assembly 8 and is inclined to the disk assembly spindle axis. The gasket 21 of FIG. 3 is received and supported on surface 20. The cover 24 presents a lower edge surface 25 that is planar and is compressively retained against gasket 21 by a series of three spring clips 28. The cover 24 includes a series of latch structures 30 that cooperate with the spring clips 28 and include rigid downwardly depending tabs 31 that cooperate with the base casting to provide alignment between base 6 and cover 24. In the assembled condition, the latch rigid depending tab 31 is received in the base casting groove along the surface 34 and is confined by the end surfaces 35. Each spring clip 28 has a pair of flexible hook portions 37 that engage the margin of the base casting and a central tab 38 that is received by and retained by the latch central hook portion 40. With the hook portions 37 engaging the base 6 and the central tab 38 engaging the latch central hook portion 40, the upper part 41 of the spring clip can be flexed to an over center position to secure cover and base together. In the latched position, the upper margin 42 of the spring clip is retained under the turned upper marginal portion 43 of latch 30. The base casting 6 also presents confronting surfaces along the edges of the planar surface area 20 on which the gasket 21 is supported to confine and align the cover 24. The cover engages gasket 21 between the vertical portion 7 and the confronting wall surface 45 (FIG. 1) of support structure 17 and within the inclined surfaces 16, 17.

The disk drive as illustrated includes four disks clamped together as an assembly 8 and to the spindle 48 by a clamping ring 50 (FIG. 2). The upper clamp element 51 has interior apertures 52 and apertures 53 along the line of contact with the upper disk surface and each of the spacers (not shown) between adjoining disks are apertured to enable air entering axially downward along the spindle to be expelled radially along each of the disk surfaces. A hub cap 55 with depending vanes 56 is secured to the spindle by a clip 57. The disk and spindle assembly is rotated in unison by a motor (not shown) which is attached to the spindle shaft and recessed in the base casting exterior to the space defined by the casting and the cover. The spindle shaft extends through base casting 6, being supported in bearings mounted in a bearing tower affixed to or formed in the base casting.

Also secured to the inner surface of the cover 24 is a filter cartridge assembly 60 including a recirculating filter media 61 and a breather filter media 62. The cartridge is retained by a filter clip 63 that engages a boss 64 on the cartridge that extends through the cover aperture 65. The breather filter media 62 filters air entering through the cover apertures 66 with passage through the media assured by the gasket 67 positioned between cartridge 60 and cover 24.

Figure 5:
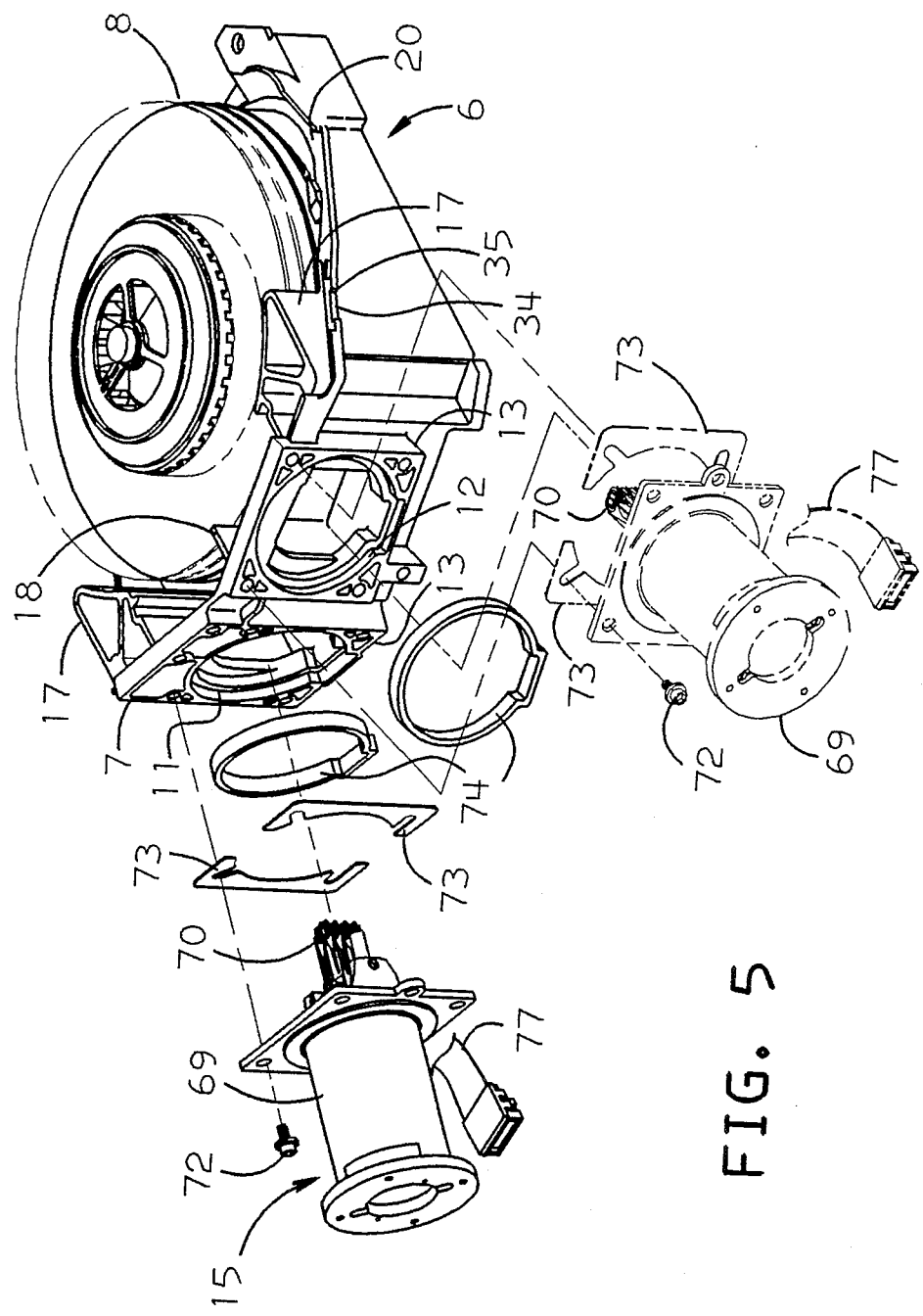
FIG. 5 is an exploded perspective view illustrating the mounting of the actuators to the base member.

The actuators 15, 16 are mounted on the base casting 6 with the voice coil motor section 69 projecting outward and the transducer carriage assembly 70 (FIG. 5) projecting through the apertures 11, 12 respectively at which the actuator is mounted. As shown in FIG. 5, each actuator is secured to the base casting by four mounting screws 72 with air tight integrity maintained by a pair of shims 73 and an actuator seal 74. In this figure, the inwardly projecting transducer assembly 70 with the associated flexure mountings, sliders, gimbeling and load beams is also visible. It will be noted that the actuator assemblies 15, 16 are mounted on casting 6 in vertically offset positions to permit actuator 16 to access the upper two disks and actuator 15 to access the lower two disks.

Figure 4:
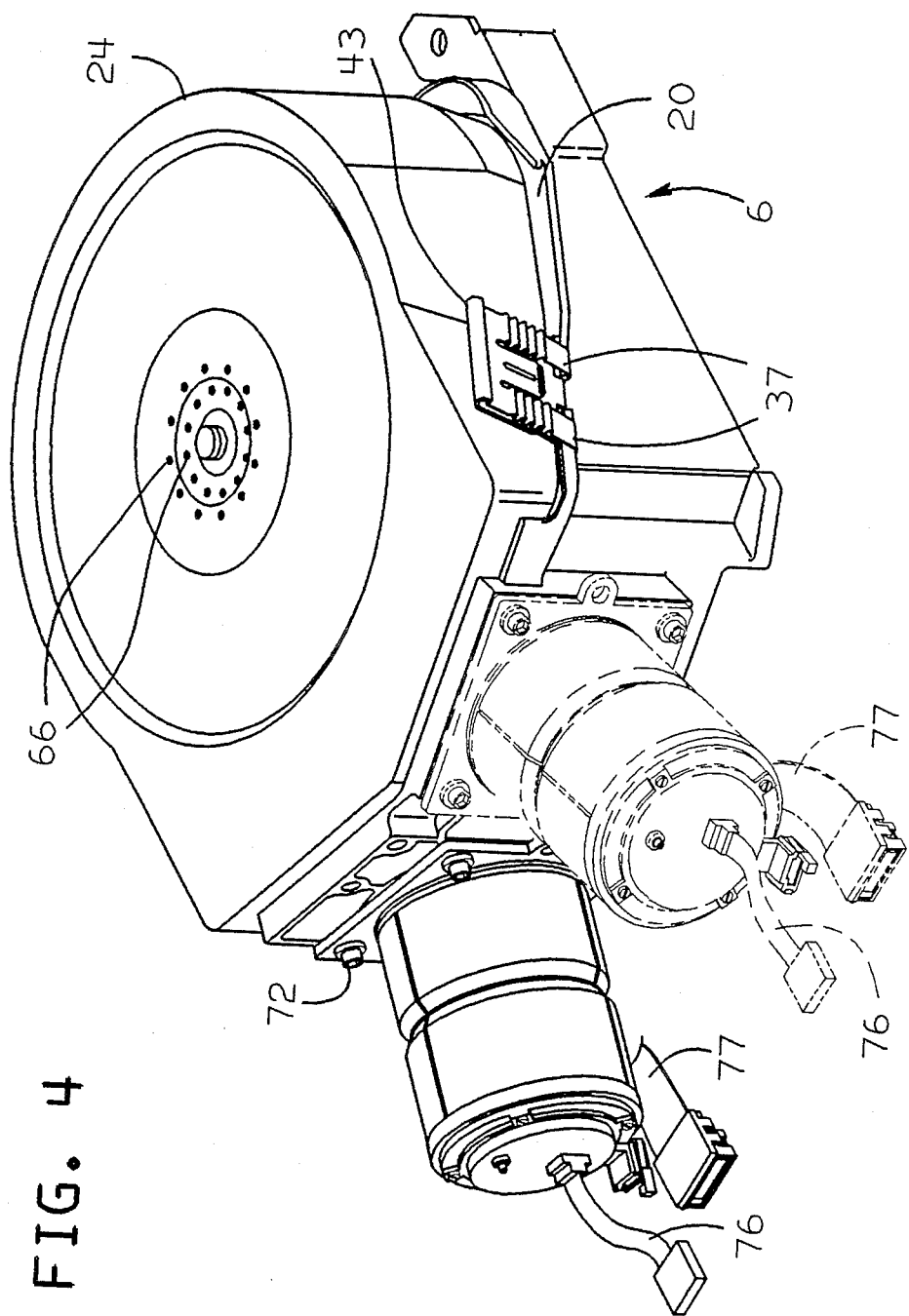
FIG. 4 is a perspective view of the disk drive with the cover and actuators assembled to the base member.

FIG. 4 shows the disk drive in the assembled condition with actuators 15, 16 attached and the cover 24 retained on the base casting 6 by the spring clips 28 in the secured position. The electronics within the enclosure defined by the base and cover assembly are connected to the exterior by the flexible flat cables 76 which connect to the voice coil motor of the actuator and the actuator cables 77 which connect to the arm electronics or directly to the transducers to read and write data from or to the disk surfaces.

When the drive is assembled with the disk assembly 8, drive motor, and actuators 15, 16 mounted on base casting 6, but with the cover 24 removed in a clean room assembly environment, the disk assembly may be rotated and the product actuators 15, 16 utilized during the servo writing of the permanent data on the disk surfaces. The accessibility of the disks at the side radially opposite the product actuators, makes it possible for multiple transducer heads to simultaneously access the disk surfaces without the necessity of suspending the head mounting structures over the disk stack where they might be prone to allow debris to fall on the disk data surface during servo writing operations. The servo writing procedure often requires the use of clock and speed heads in addition to the multiple servo heads positioned at each of the data surfaces.

While the invention has been particularly shown and described with reference to a preferred embodiment, it will be understood by those skilled in the art that various changes in form and details may be made therein without departing from the spirit and scope of the invention.

What is claimed is:

1. A head-disk enclosure assembly for a rigid disk drive which includes a plurality of disks mounted on a spindle for rotation in unison about the axis of the spindle comprising:

a base on which said spindle is mounted for rotation about said spindle axis;

an actuator carrying transducer heads mounted on said base;

said base including an axially extending wall along one side of said disks, said wall presenting means for mounting said actuator;

a cover member that cooperates with said base along a continuous closed planar interface surface to enclose said plurality of disks, said planar interface being non-perpendicular with respect to and surrounding said spindle axis, said interface extending above the uppermost disk surface at said one side of said disks and extending below the lowermost disk surface at the side opposite said one side, whereby radial access to said disks diametrically opposite said actuator mounting means is unobstructed when said cover member is removed; and securing means for attached said cover member to said base wherein a portion of said planar interface surface is formed by an upper surface portion of said axially extending wall and further comprising gasket means for sealing the planer interface that extends in a continuous closed configuration between said base and said cover and is compressively retained therebetween.

2. The head disk enclosure of claim 1 wherein said base comprises a casting and wherein, at said one side, said means for mounting includes an opening therethrough for mounting the said actuator carrying transducer heads.

3. The head-disk enclosure assembly of claim 2 wherein said base includes flange portions along the outer margins of said planar interface which confine said gasket means and said cover member.

4. A head-disk enclosure assembly for a rigid disk drive which includes a plurality of disks mounted on a spindle for rotation in unison about the axis of such spindle comprising:

a base upon which said spindle is mounted for rotation about the axis of said spindle;

an actuator mounted on said base which carries magnetic transducers and positions such transducers in data transfer relation to a selected one of a plurality of concentric tracks on a disk surface;

said base having a wall portion that extends axially along one side of said plurality of disks and presenting a planar, continuous closed interface surface surrounding said disks with said interface surface at said one side being above the plane of the uppermost disk surface and at the side diametrically opposite said one side being below the plane of the lowermost disk surface;

a cover member that cooperates with said base along said planar interface surface to enclose said plurality of disks, said interface surface being non-perpendicular with respect to and surrounding said spindle axis, whereby radial access to said disks diametrically opposite said one side, and access to the upper surface of the disk stack, are both unobstructed when said cover is removed; and securing means for connecting said cover to said base said securing means comprising gasket means for sealing the planar interface that extends in a continuous closed configuration along said planar interface surface between said said base and said cover and is compressively retained therebetween.

5. The head-disk enclosure assembly of claim 4 wherein said base is comprised of a configuration wherein at said one side, said wall portion has an opening therethrough for receiving said actuator and said assembly further comprises mounting means adjacent said opening for securing said actuator to said wall portion.

6. The head-disk enclosure assembly of claim 5 wherein said base includes flange portions along the margins of said interface surface which confine said gasket means and said cover member.

* * * * *